United States Patent
Griggs

(10) Patent No.: US 7,522,520 B2
(45) Date of Patent: Apr. 21, 2009

(54) FLOW CONTROL CREDIT UPDATES FOR VIRTUAL CHANNELS IN THE ADVANCED SWITCHING (AS) ARCHITECTURE

(75) Inventor: Aric Griggs, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 10/934,085

(22) Filed: Sep. 3, 2004

(65) Prior Publication Data

US 2006/0050632 A1    Mar. 9, 2006

(51) Int. Cl.
 *H04J 3/16* (2006.01)
(52) U.S. Cl. ........................... 370/230; 370/235
(58) Field of Classification Search ............... None
See application file for complete search history.

(56) References Cited

U.S. PATENT DOCUMENTS

| | | | | |
|---|---|---|---|---|
| 6,078,565 | A * | 6/2000 | Ben-Michael et al. ....... | 370/236 |
| 6,691,192 | B2 * | 2/2004 | Ajanovic et al. ............ | 710/107 |
| 6,993,611 | B2 * | 1/2006 | Ajanovic et al. ............ | 710/107 |
| 7,042,842 | B2 * | 5/2006 | Paul et al. .................. | 370/229 |
| 2002/0087720 | A1 * | 7/2002 | Davis et al. ................. | 709/238 |
| 2003/0026267 | A1 * | 2/2003 | Oberman et al. ............ | 370/397 |
| 2006/0092842 | A1 * | 5/2006 | Beukema et al. ............ | 370/235 |

OTHER PUBLICATIONS

Mayhew et al—PCI Express and Advanced Switching: Evolutionary Path to Building Next Generation Interconnects—Aug. 20-22, 2003—pp. 21-29.
PCT/US2005/028695 International Search Report and Written Opinion Mailed—Dec. 9, 2005.

* cited by examiner

*Primary Examiner*—Chi H. Pham
*Assistant Examiner*—Soon D. Hyun
(74) *Attorney, Agent, or Firm*—Caven & Aghevli LLC

(57) ABSTRACT

Devices in an Advanced Switching (AS) fabric may include state machines for controlling the generation and transmission of flow control (FC) update data link layer packets (DLLPs) between link partners. A link partner may use the state machine to generate flow control update DLLPs for all available virtual channels (VCs) and transmit the FC update DLLPs contiguously to prevent any given VC from failing to perform an FC update refresh within an FC update timeout period due to injection of large packets (e.g., AS transaction layer packets (TLPs)) between the FC Update DLLPs.

28 Claims, 4 Drawing Sheets

FLOW CONTROL CREDIT UPDATES FOR VIRTUAL CHANNELS IN THE ADVANCED SWITCHING (AS) ARCHITECTURE

BACKGROUND

PCI (Peripheral Component Interconnect) Express is a serialized I/O interconnect standard developed to meet the increasing bandwidth needs of the next generation of computer systems. PCI Express was designed to be fully-compatible with the widely used PCI local bus standard. PCI is beginning to hit the limits of its capabilities, and while extensions to the PCI standard have been developed to support higher bandwidths and faster clock speeds, these extensions may be insufficient to meet the rapidly increasing bandwidth demands of PCs in the near future. With its high-speed and scalable serial architecture, PCI Express may be an attractive option for use with or as a possible replacement for PCI in computer systems. The PCI Express architecture is described in the PCI Express Base Architecture Specification, Revision 1.0a (Initial release Apr. 15, 2003), which is available through the PCI-SIG (PCI-Special Interest Group) (http://www.pcisig.com].

Advanced Switching (AS) is an extension to the PCI Express architecture. AS utilizes a packet-based transaction layer protocol that operates over the PCI Express physical and data link layers. The AS architecture provides a number of features common to multi-host, peer-to-peer communication devices such as blade servers, clusters, storage arrays, telecom routers, and switches. These features include support for flexible topologies, packet routing, congestion management (e.g., credit-based flow control), fabric redundancy, and failover mechanisms. The AS architecture is described in the Advanced Switching Core Architecture Specification, Revision 1.0 (the "AS Specification") (December 2003), which is available through the ASI-SIG (Advanced Switching Interconnect-SIG) (http//:www.asi-sig.org).

DETAILED DESCRIPTION

Figure 1:
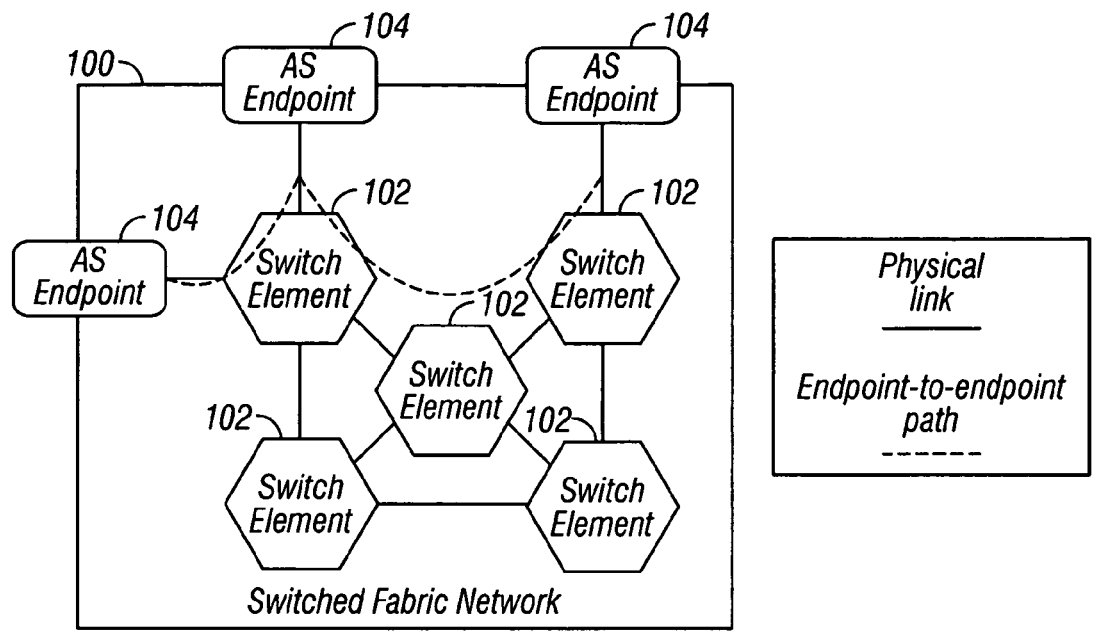
FIG. 1 is a block diagram of a switched fabric network according to an embodiment.

FIG. 1 shows a switched fabric network 100 according to an embodiment. The network may include switch elements 102 and end nodes 104. The switch elements 102 constitute internal nodes of the network 100 and provide interconnects with other switch elements 102 and end nodes 104. The end nodes 102 reside on the edge of the switch fabric and represent data ingress and egress points for the switch fabric. The end nodes may encapsulate and/or translate packets entering and exiting the switch fabric and may be viewed as "bridges" between the switch fabric and other interfaces.

Figure 2:
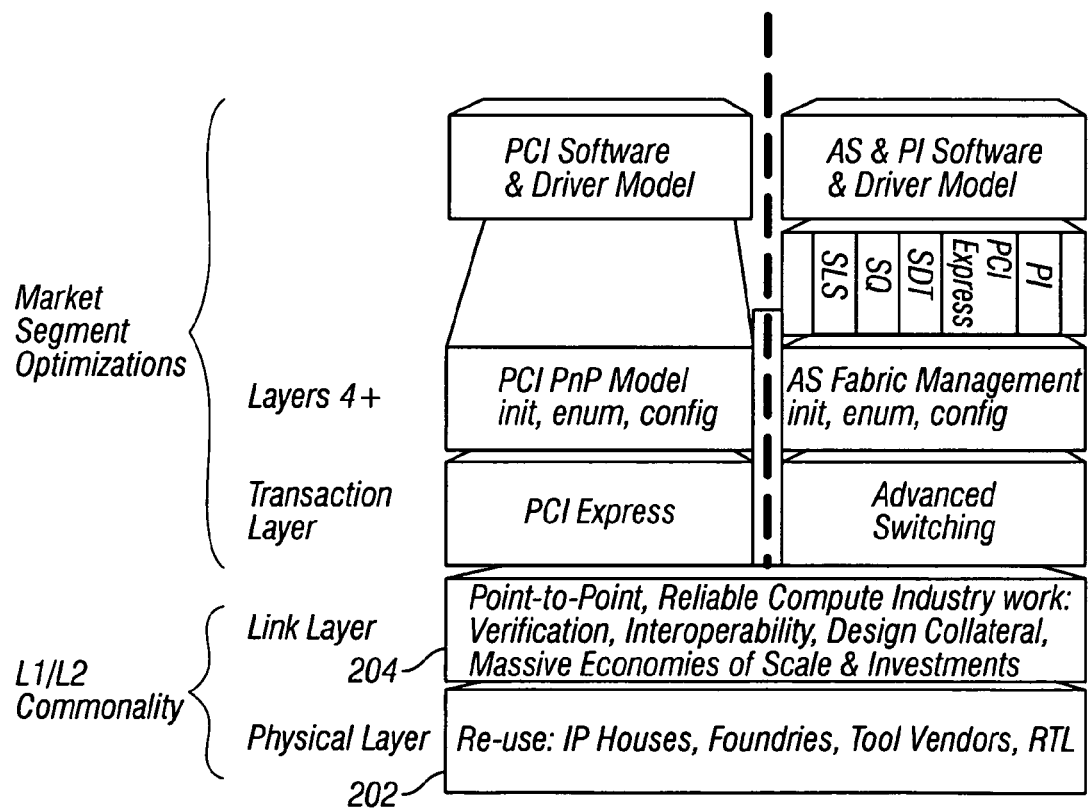
FIG. 2 shows the protocol stacks for the PCI Express and Advanced Switching (AS) architectures.

The network 100 may have an Advanced Switching (AS) architecture. AS utilizes a packet-based transaction layer protocol that operates over the PCI Express physical and data link layers 202, 204, as shown in FIG. 2.

Figure 3:
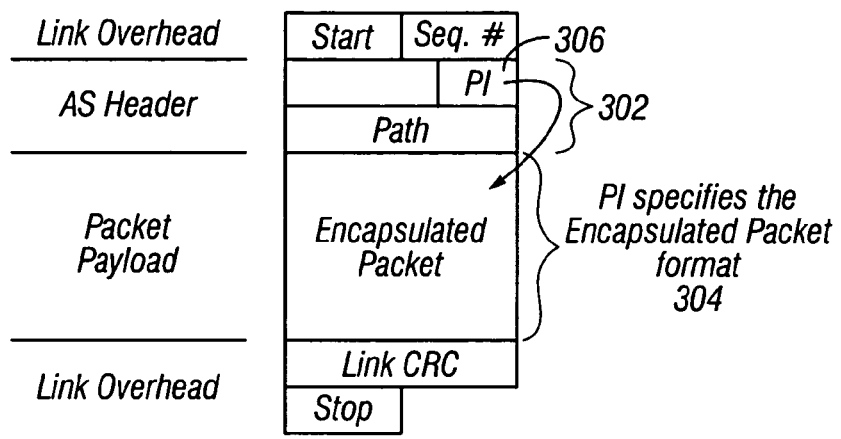
FIG. 3 illustrates an AS transaction layer packet (TLP) format.

AS uses a path-defined routing methodology in which the source of a packet provides all information required by a switch (or switches) to route the packet to the desired destination. FIG. 3 shows an AS transaction layer packet (TLP) format 300. The packet includes a route header 302 and an encapsulated packet payload 304. The AS route header 302 contains the information necessary to route the packet through an AS fabric (i.e., "the path"), and a field that specifies the Protocol Interface (PI) of the encapsulated packet. AS switches use only the information contained in the route header 302 to route packets and do not care about the contents of the encapsulated packet 304.

Figure 4:
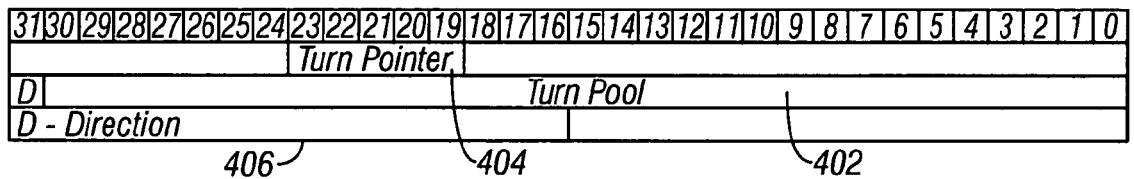
FIG. 4 illustrates an AS route header format.

A path may be defined by the turn pool 402, turn pointer 404, and direction flag 406 in the route header, as shown in FIG. 4. A packet's turn pointer indicates the position of the switch's "turn value" within the turn pool. When a packet is received, the switch may extract the packet's turn value using the turn pointer, the direction flag, and the switch's turn value bit width. The extracted turn value for the switch may then used to calculate the egress port.

The PI field 306 in the AS route header 302 (FIG. 3) specifies the format of the encapsulated packet. The PI field is inserted by the end node that originates the AS packet and is used by the end node that terminates the packet to correctly interpret the packet contents. The separation of routing information from the remainder of the packet enables an AS fabric to tunnel packets of any protocol.

PIs represent fabric management and application-level interfaces to the switched fabric network 100. Table 1 provides a list of PIs currently supported by the AS Specification.

TABLE 1

| AS protocol encapsulation interfaces | |
|---|---|
| PI number | Protocol Encapsulation Identity (PEI) |
| 0 | Fabric Discovery |
| 1 | Multicasting |
| 2 | Congestion Management |
| 3 | Segmentation and Reassembly |
| 4 | Node Configuration Management |
| 5 | Fabric Event Notification |
| 6 | Reserved |
| 7 | Reserved |
| 8 | PCI-Express |
| 9-223 | ASI-SIG defined PEIs |
| 224-254 | Vendor-defined PEIs |
| 255 | Invalid |

PIs 0-7 are reserved for various fabric management tasks, and PIs 8-254 are application-level interfaces. As shown in Table 1, PI8 is used to tunnel or encapsulate native PCI Express. Other PIs may be used to tunnel various other protocols, e.g., Ethernet, Fibre Channel, ATM (Asynchronous Transfer Mode), InfiniBand®, and SLS (Simple Load Store). An advantage of an AS switch fabric is that a mixture of protocols may be simultaneously tunneled through a single, universal switch fabric making it a powerful and desirable feature for next generation modular applications such as media gateways, broadband access routers, and blade servers.

The AS architecture supports the implementation of an AS Configuration Space in each AS device in the network. The AS Configuration Space is a storage area that includes fields to specify device characteristics as well as fields used to control the AS device. The information is presented in the form of capability structures and other storage structures, such as tables and a set of registers. Table 2 provides a set of capability structures ("AS native capability structures") that are defined by the AS Specification.

TABLE 2

AS Native Capability Structures

| AS Native Capability Structure | End nodes | Switch Elements |
|---|---|---|
| Baseline Device | R | R |
| Spanning Tree | R | R |
| Spanning Tree Election | O | N/A |
| Switch Spanning Tree | N/A | R |
| Device PI | O | O |
| Scratchpad | R | R |
| Doorbell | O | O |
| Multicast Routing Table | N/A | O |
| Semaphore | R | R |
| AS Event | R | R |
| AS Event Spooling | O | N/A |
| AS Common Resource | O | N/A |
| Power Management | O | N/A |
| Virtual Channels | R w/OE | R w/OE |
| Configuration Space Permission | R | R |
| Endpoint Injection Rate Limit | O | N/A |
| Status Based Flow Control | O | O |
| Minimum Bandwidth Scheduler | N/A | O |
| Drop Packet | O | O |
| Statistics Counters | O | O |
| SAR | O | N/A |
| Integrated Devices | O | N/A |

Legend:
O = Optional normative
R = Required
R w/OE = Required with optional normative elements
N/A = Not applicable The information stored in the AS native capability structures may be accessed through PI-4 packets, which are used for device management.

In one implementation of a switched fabric network, the AS devices on the network may be restricted to read-only access of another AS device's AS native capability structures, with the exception of one or more AS end nodes which have been elected as fabric managers.

A fabric manager election process may be initiated by a variety of either hardware or software mechanisms to elect one or more fabric managers for the switched fabric network. A fabric manager is an AS endpoint that "owns" all of the AS devices, including itself, in the network. If multiple fabric managers, e.g., a primary fabric manager and a secondary fabric manager, are elected, then each fabric manager may own a subset of the AS devices in the network. Alternatively, the secondary fabric manager may declare ownership of the AS devices in the network upon a failure of the primary fabric manager, e.g., resulting from a fabric redundancy and failover mechanism.

Once a fabric manager declares ownership, it has privileged access to it's AS devices' AS native capability structures. In other words, the fabric manager has read and write access to the AS native capability structures of all of the AS devices in the network, while the other AS devices are restricted to read-only access, unless granted write permission by the fabric manager.

According to the PCI Express Link Layer definition a link is either down (DL_Inactive=no transmission or reception of packets of any type), fully active (DL_Active), i.e., fully operational and capable of transmitting and receiving packets of any type or in the process of being initialized (DL_Init).

AS architecture adds to PCI Express' definition of this state machine by introducing a new data-link layer state, DL_Protected, which becomes an intermediate state between the DL_Init and DL_Active states. The PCI Express DL_Inactive, DL_Init, and DL_Active states are preserved. The new state may be needed to an intermediate degree of communication capability and serves to enhance an AS fabric's robustness and HA (High Availability) readiness.

Link states may be communicated between link partners via DLLPs (Data Link Layer Packets), which are 6-byte packets that communicate link management specific information between the two devices sharing the link. Link state DLLPs have strict priority over all packets (TLPs and DLLPs) except packets that are in-flight. Link state acknowledgements must be sent as early as possible, i.e., as soon as the transmission of the packet currently occupying the link is completed.

The AS architecture supports the establishment of direct endpoint-to-endpoint logical paths known as Virtual Channels (VCs). This enables a single switched fabric network to service multiple, independent logical interconnects simultaneously, each VC interconnecting AS end nodes for control, management, and data. Each VC provides its own queue so that blocking in one VC does not cause blocking in another. Since each VC has independent packet ordering requirements, each VC may be scheduled without dependencies on the other VCs.

The AS architecture defines three VC types: Bypass Capable Unicast (BVC); Ordered-only Unicast (OVC); and Multicast (MVC). BVCs have two queues—an ordered queue and a bypass queue. The bypass queue provides BVCs bypass capability, which may be necessary for deadlock free tunneling of protocols. OVCs are single queue unicast VCs, which may be suitable for message oriented "push" traffic. MVCs are single queue VCs for multicast "push" traffic.

When the fabric is powered up, link partners in the fabric may negotiate the largest common number of Virtual Channels of each VC type. During link training, the largest common sets of VCs of each VC type are initialized and activated prior to any non-DLLP AS packets being injected into the fabric.

During link training, surplus BVCs may be transformed into OVCs. A BVC can operate as an OVC by not utilizing its bypass capability, e.g., its bypass queue and associated logic. For example, if link partner A supports three BVCs and one OVC and the link partner B supports one BVC and two OVCs, the agreed upon number of VCs would one BVC and two OVCs, with one of link partner A's BVCs being transformed into an OVC.

The AS architecture provides a number of congestion management techniques, one of which is a credit-based flow control (FC) technique used to prevent packets from being lost due to congestion. Link partners (e.g., an endpoint 104 and a switch element 102) in the network exchange FC credit information, e.g., the local device's available buffer space for a particular VC, to guarantee that the receiving end of a link has the capacity to accept packets.

FC credits may be computed on a VC-basis by the receiving end of the link and communicated to the transmitting end of the link. Typically, TLPs may be transmitted only when there are enough credits available for a particular VC to carry the packet. Upon sending a packet, the transmitting end of the link may debit its available credit account by an amount of FC credits that reflects the size of the sent packet. As the receiving end of the link processes (e.g., forwards to an endpoint 104) the received packet, space is made available on the corresponding VC and FC credits are returned to the transmission end of the link. The transmission end of the link then adds the FC credits to its credit account.

AS Ports refresh their link partner's credit information by periodically sending them FC credit update information. Credit update information is transmitted using FC Update DLLPs. While FC credit accounting is typically tracked by a transmitting port between FC credit updates, an FC Update DLLP takes precedence over locally calculated credit availability information. With each FC credit update, the receiving side of the FC credit update may discard any local FC credit availability tracking information and resynchronize with the credit information provided by the FC Update DLLP.

The FC Update DLLP may be used to update available credit for both unicast VCs (VC IDs 0-15) and multicast VCs (VC IDs 16-19). Each FC Update DLLP corresponds to either one or two VCs, depending upon the value specified by the VC Index (VCI) field. FC Update DLLPs that specify a VCI in the range VCI0-VCI7 contain credit values for one BVC, i.e., one credit value for the specified BVC's ordered queue and one credit value for bypass Queue FC credit information. FC Update DLLPs that specify a VCI in the range VCI8-VCI11 (which support OVCs VC8-VC15) contain credit values for the queue of two successively numbered OVCs within the same DLLP. Similarly, FC credit update DLLPs that specify a VCI in the range VCI12-VCI13 (which support MVCs VC16-VC19) contain credit values for the queue of two successively numbered MVCs within the same DLLP. VC Indices 14-15 are reserved.

DLLP transmission may be unreliable, making DLLPs subject to silent loss or corruption. According to the AS Specification, all AS ports are required to maintain a periodic FC credit update "refresh loop" such that each active VC's FC credit is advertised by FC Update DLLP at intervals no greater than $2^{15}$ 8b/10b symbol times. If the maximum credit refresh interval is exceeded for a given VC, the credit advertising port must, for this case only, elevate the FC Update DLLP to highest priority so that the FC Update DLLP for the subject VC is transmitted at the earliest opportunity.

Typically, FC Update DLLPs may be sent individually on the different available VCs at a predefined timeout interval (e.g., less than or equal to the maximum $2^{15}$ symbol times). However, there is a possibility that a TLP, which may be quite large, may be sent between FC Update DLLPs for different active VCs. This may delay the sending of an FC Update DLLP such that the timeout interval is exceeded, which may lead to credit related starvation, e.g., a possible lack of packets being sent from the link partner due to lack of available credit information.

In an embodiment, FC Update DLLPs for all active VCs may be sent back-to-back to prevent the injection of a TLP between FC Update DLLPs and any corresponding credit related performance problems. The technique may ensure that the link partner is informed of the updated credit values within the allotted time period. Any additional overhead associated with this FC Update DLLP transmission technique may be offset compared to the possible lack of packets being sent from the link partner due to lack of available credit information.

Figure 5:
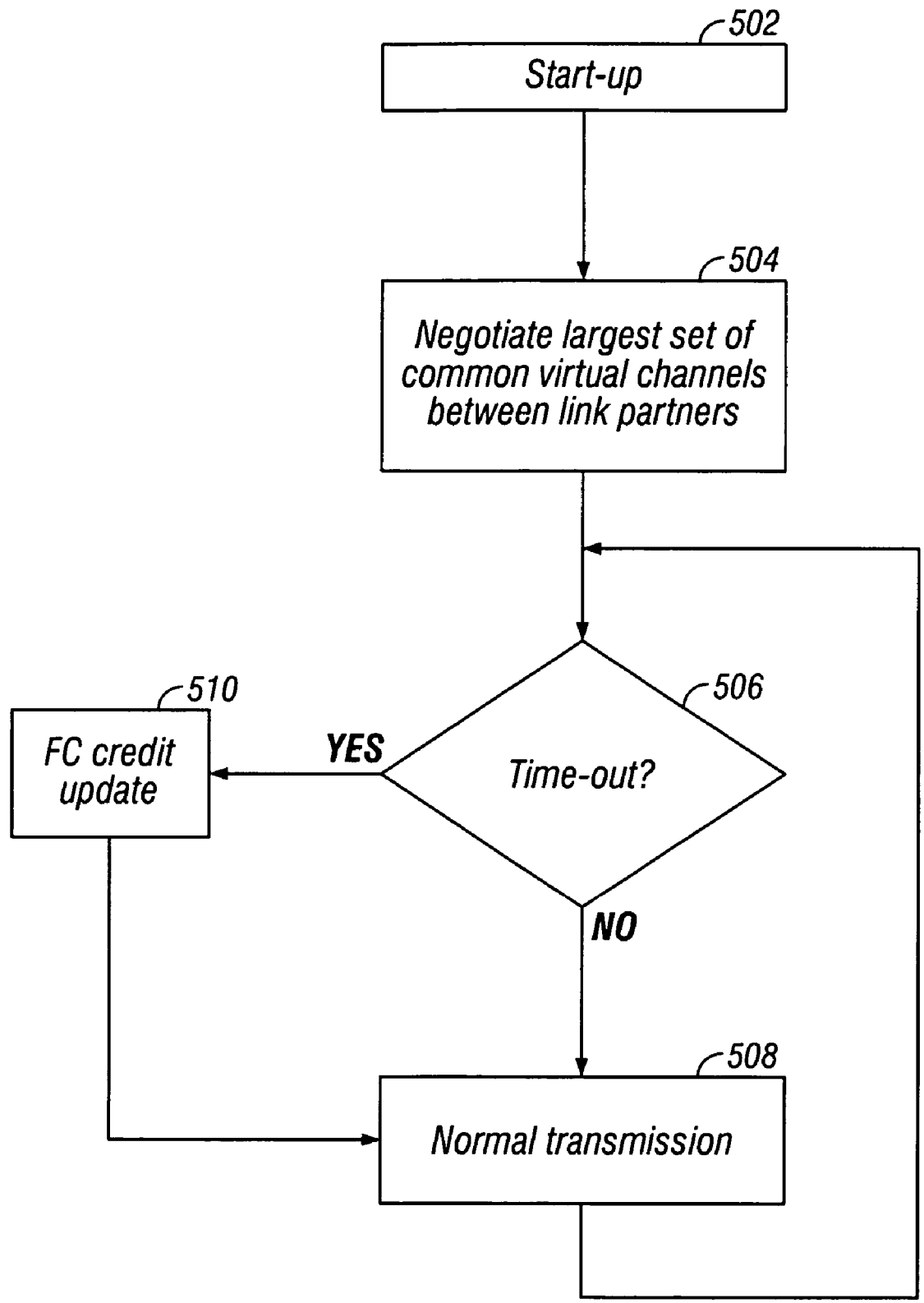
FIG. 5 is a flowchart describing an FC credit update operation according to an embodiment.

FIG. 5 is a flowchart describing an FC credit update operation according to an embodiment. After start-up (block 502), link partners may negotiate the largest common set of virtual channels (block 504). The VC negotiation may be a two phase process. In a first phase, the link partners may discover the largest set of BVCs and send initialization DLLPs to provide initial FC credit values for the BVCs. In the second phase, the link partners may discover and initialize the largest common set of OVCs and MVCs. BVC to OVC transformations may then be performed.

An update clock may countdown the update timeout period, which may be a value less than or equal to the specified maximum $2^{15}$ symbol times (block 506). Between updates, the link partners may operate normally (block 508), transmitting TLPs and non-FC credit update DLLPs on the link, e.g., Link State DLLPs, link management DLLPs, etc. When the timeout period expires, an FC credit update operation may be performed in which FC Update DLLPs for all active VCs are transmitted back-to-back (block 510).

Figure 6:
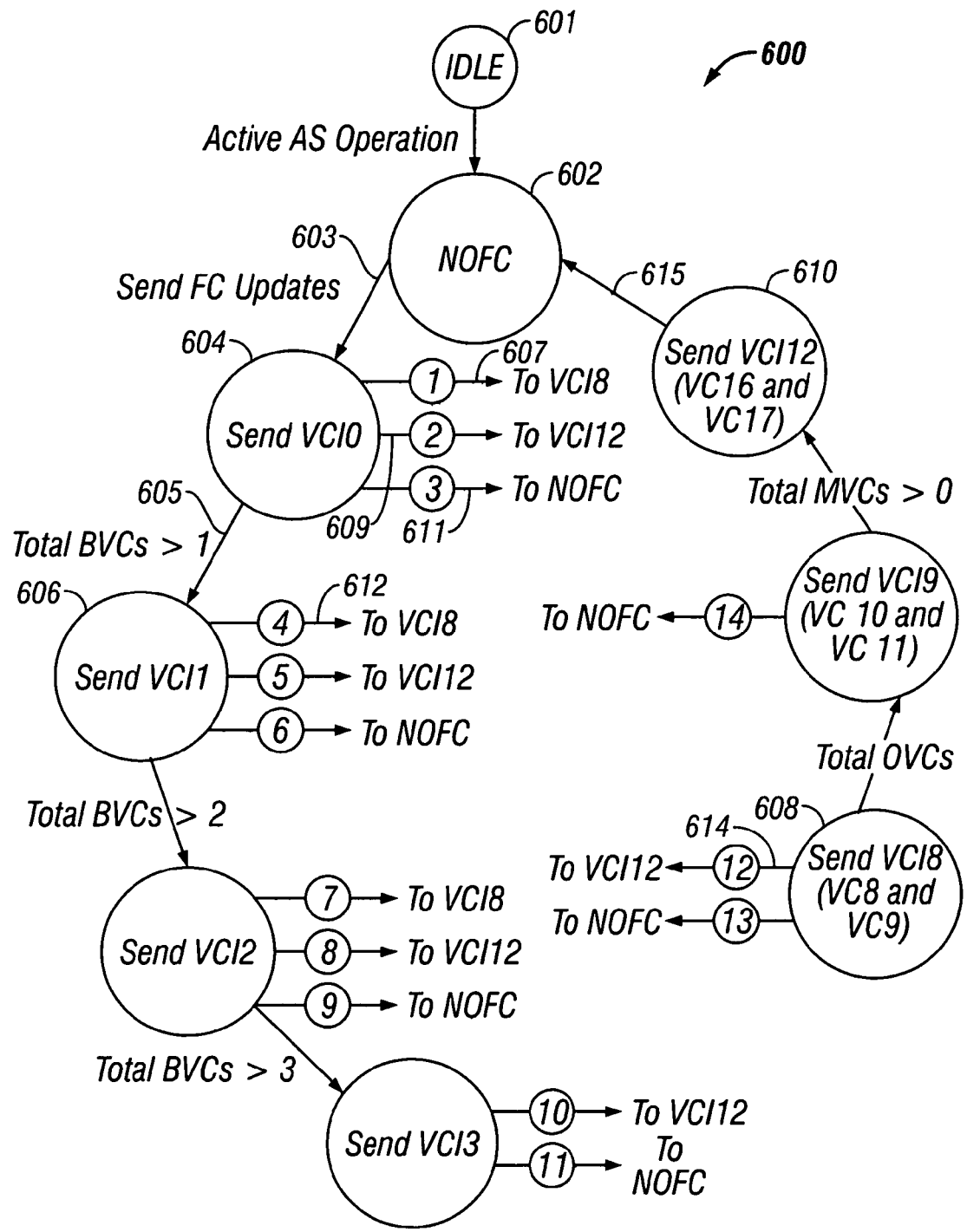
FIG. 6 illustrates a state machine for preparing and transmitting a sequence of FC credit update data link layer packets (DLLPs).

The link partner may utilize a state machine 600 such as that shown in FIG. 6 to prepare and transmit the sequence of FC credit update DLLPs. The state machine enters a NOFC (or "hold") state 602 after set-up (IDLE 601) and remains in the NOFC state 607 between timeout periods (e.g., during normal transmission). When a timeout event occurs, the link partner may prepare and transmit FC Update DLLPs as it traverses the states in the state machine.

The state machine 600 as shown in FIG. 6 corresponds to a local device that natively supports four BVCs and one MVC. As such, the state machine includes possible states for four BVC VCIs (VCI0 to VCI3), two OVC VCIs (VCI8 and VCI9), and one MVC VCI (VCI12). The two OVC VCIs (which can handle up to four OVC FC credit updates) are provided since three of the four BVCs could possibly be downgraded to OVCs during initialization. Devices that natively support other sets of VCs may have different state machine configurations, however, according to the AS Specification, each AS port must support at least one BVC (VC0). The state machine may be expanded to have a state for each VCI if necessary.

The state machine 600 may first transition 603 to state 604 (VCI0) and generate and transmit an FC Update DLLP for BVC VC0. If there are more active BVCs, the state machine may transition 605 to state 606 (VCI1) and generate and transmit an FC Update DLLP for BVC VC1. If there are no more BVCs and there are one or more active OVCs (either natively supported or downgraded BVCs), the state machine may transition 607 to state 608 (VCI8) and transmit an FC Update DLLP (VC Index 8) for OVC VC8, and VC9 (if active), since VCIs for OVCs and MVCs can contain credit values for two successive VCs. From state 604, if there are no more active BVCs, no active OVCs, and one or more active MVCs, the state machine may transition 609 directly to state 610 (VCI12) and generate an FC Update DLLP (VC Index 12) for VC16, and VC17 (if active). From state 604, if there are no more active BVCs and no active OVCs or MVCs, the state machine may transition 611 back to NOFC 602.

Each state may have similar number of options as state 604 (VCI0), moving to the next state of its kind or skipping to the next set of VCIs or to NOFC 602 as appropriate. In an embodiment, the FC Update DLLPs may be buffered until all of the FC Update DLLPs to be transmitted are generated and then may be sent the link partner back-to-back.

For example, if the link partner for the local device with state machine 600, which natively supports four BVCs and one MVC, has a link partner that natively supports two BVCs, two OVCs, and one MVC, then the agreed upon active VCs will be two BVCs, two OVCs, and one MVC. During discovery and initialization, two of the BVCs of the local device will be downgraded to OVCs and mapped to VC8 and VC9 (VCI8). When a timeout (update) event occurs, the state machine in the local device in NOFC 602 will transition 603 to state 604 (VCI0) and generate and transmit an FC Update DLLP with credit values of the bypass and ordered queues for BVC VC0 to the link partner. The state machine may then transition 605 to state 606 (VCI1) and generate and transmit an FC Update DLLP with credit values for BVC VC1 to the link partner. Since there are no more active BVCs, the state machine may transition 612 to state 608 (VCI8) and generate and transmit an FC Update DLLP with credit values for OVCs VC8 and VC9. Since there are no more active OVCs, the state machine may then transition 614 to state 610 (VCI12) and generate and transmit an FC Update DLLP with a credit value for MVC VC17. The portion of the FC Update DLLP reserved for inactive MVC VC18 may be empty (e.g., all zeros). After transmitting the FC Update DLLP for VCI12, the state machine may transition 615 to NOFC 602 until the next timeout event.

Sending FC Update DLLPs for every active VC to the link partner without interruption (e.g., contiguously) may ensure that the credit values will reach the device's link partner within the specified time period, which may facilitate simplifying the FC credit update logic.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
   in response to a flow control (FC) credit update event in a device having a link partner in a switching fabric, generating an FC credit update packet for each of a plurality of active virtual channels (VCs);
   transmitting the FC credit update packets contiguously to the link partner; and
   generating a state machine including a hold state and a plurality of FC credit update states, each FC credit update corresponding to a VC index.

2. The method of claim 1, wherein said generating the FC credit update packet comprises generating the FC credit update packet in an Advanced Switching (AS) fabric.

3. The method of claim 1, wherein said generating the FC credit update packet comprises generating an FC credit update data link layer packet (DLLP).

4. The method of claim 1, wherein generating the FC credit update packet comprises generating in response to an FC credit update refresh period expiring.

5. The method of claim 1, wherein said generating FC credit update packets comprises traversing a plurality of FC credit update states in the state machine and generating an FC credit update packet at each traversed FC credit update state.

6. The method of claim 5, further comprising:
   in an FC credit update state corresponding to a VC index, generating an FC credit update packet corresponding to the VC index and transmitting said FC credit update packet before transitioning to a next state in the state machine.

7. The method of claim 5, further comprising:
   in an FC credit update state corresponding to a VC index, generating an FC credit update packet corresponding to the VC index;
   storing said FC credit update packet; and
   transmitting said FC credit update packet with one or more other stored FC credit update packets contiguously after traversing the FC credit update states in the state machine.

8. The method of claim 1, wherein said generating the state machine comprises:
   identifying a plurality of supported VC indexes; and
   generating an FC update state for each supported VC index.

9. The method of claim 8, further comprising:
   determining if there are any potentially supported VC indexes; and generating a potential FC update state for each potentially supported VC index.

10. The method of claim 9, wherein said supported VC indexes comprises a VC index corresponding to a bypass VC (BVC) and one or more VC indexes corresponding to VCs selected from BVCs, ordered VCs (OVCs), and multicast VCs (MVCs).

11. The method of claim 9, wherein said determining comprises determining if the device supports more than one BYC; and
   wherein said generating comprises generating one or more potential FC credit update states corresponding one or more VC indexes associated with one or more OVCs in response to determining the device supports more than one BVC.

12. The method of claim 11, further comprising:
   performing a discovery and initialization operation between the device and the link partner;
   identifying any downgraded BVCs; and
   mapping the downgraded BVCs to one or more of said potential FC credit update states.

13. The method of claim 1, wherein each of the FC credit update states comprises a possible transition to the hold state.

14. The method of claim 13, wherein one or more of the FC credit update states further comprises a potential transition to an FC credit update state corresponding to a VC index of the same type and a potential transition to an FC credit update state corresponding to a VC index of a different type.

15. An apparatus comprising:
   a flow control (FC) credit update timer to generate FC credit update events;
   an FC credit update module to generate an FC credit update packet for each of a plurality of active virtual channels (VCs) and transmit the plurality of FC credit update packets contiguously to a link partner in a switching fabric in response to receiving an FC credit update event; and
   a state machine including a hold state and a plurality of FC credit update states.

16. The apparatus of claim 15, wherein the FC credit update module is operative to traverse the plurality of credit update states in response to receiving the credit update event.

17. The apparatus of claim 16, wherein the plurality of FC credit update states comprise a plurality of supported FC credit update states.

18. The apparatus of claim 17, wherein the plurality of supported FC credit update states comprise a VC index corresponding to a bypass VC (BVC) and one or more VC indexes corresponding to VCs selected from BVCs, ordered VCs (OVCs), and multicast VCs (MVCs).

19. The apparatus of claim 18, further comprising one or more potential FC credit update states.

20. The apparatus of claim 19, wherein the one or more potential FC credit update states correspond to one or more VC indexes associated with one or more OVCs.

21. The apparatus of claim 19, wherein the FC credit update module is operative to:
   negotiate a plurality of active VCs with the link partner;
   identify a plurality of active FC credit update states selected from the supported FC credit update states and the one or more potential FC credit update states; and
   traverse the active FC credit update states in response to the FC credit update event.

22. The apparatus of claim 16, wherein each of the plurality of FC credit update states in the state machine comprise a potential transition to the hold state.

23. The apparatus of claim 22, wherein one or more of the FC credit update states further comprises a potential transition to an FC credit update state corresponding to a VC index of the same type and a potential transition to an FC credit update state corresponding to a VC index of a different type.

24. An article comprising a machine-readable medium including machine-executable instructions to cause a computer to:

generate an FC credit update packet for each of a plurality of active virtual channels (VCs) in response to a flow control (FC) credit update event in a device having a link partner in a switching fabric;

transmit the FC credit update packets contiguously to the link partner; and generate a state machine including a hold state and a plurality of FC credit update states, each FC credit update corresponding to a VC index.

25. The article of claim 24, wherein the switching fabric comprises an Advanced Switching (AS) fabric.

26. The method of claim 1, wherein transmitting the FC credit update packets contiguously to the link partner is performed without interruption.

27. The apparatus of claim 15, wherein the FC credit update module is to transmit the plurality of FC credit update packets contiguously to the link partner without interruption.

28. The article of claim 24, wherein transmitting the FC credit update packets contiguously to the link partner is performed without interruption.

* * * * *